Jan. 13, 1970     E. A. LAUBER     3,489,461
CUTTER-SPEED AND FEED-RATE REGULATOR FOR TUNNEL EXCAVATOR
Filed April 12, 1967     3 Sheets-Sheet 1

INVENTOR
ERNST A. LAUBER

Jan. 13, 1970     E. A. LAUBER     3,489,461
CUTTER-SPEED AND FEED-RATE REGULATOR FOR TUNNEL EXCAVATOR
Filed April 12, 1967     3 Sheets-Sheet 2
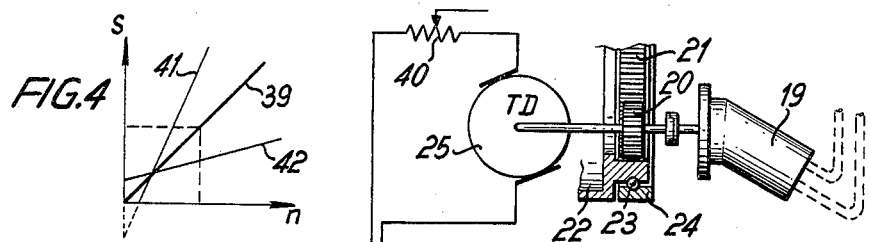
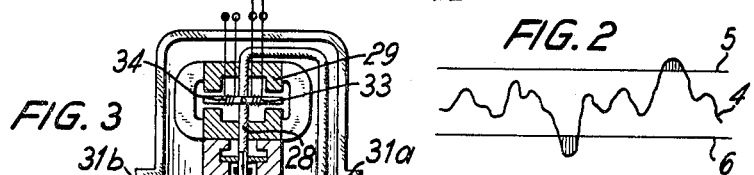
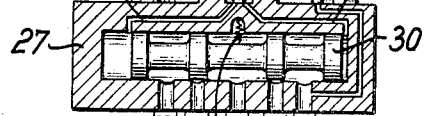
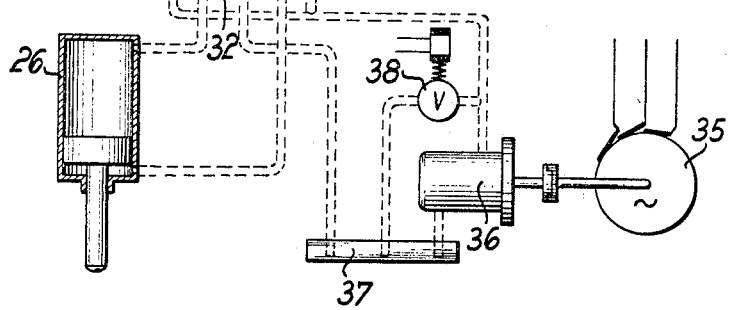
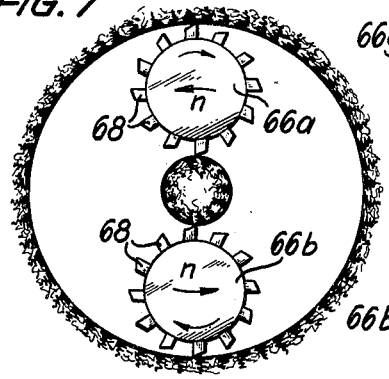
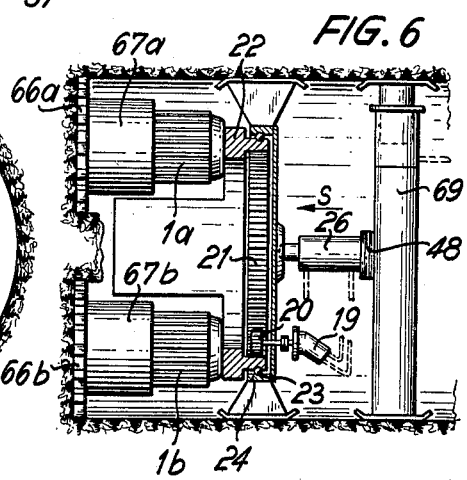
INVENTOR
ERNST A. LAUBER United States Patent Office 3,489,461
Patented Jan. 13, 1970

3,489,461
CUTTER-SPEED AND FEED-RATE REGULATOR
FOR TUNNEL EXCAVATOR
Ernst Abraham Lauber, Thun, Switzerland, assignor to
Habegger AG. Maschinenfabrik, Thun, Switzerland
Filed Apr. 12, 1967, Ser. No. 630,419
Int. Cl. E21c 5/00; B23q 5/12
U.S. Cl. 299—1                                    9 Claims

ABSTRACT OF THE DISCLOSURE

The invention relates to a method of controlling the rotation and feed of a cutter drum having cutter heads and associated drives mounted on the drum for rotation in a planetary path in machines for boring tunnels, comprising the step of controlling the rotary speed and the longitudinal feed of the drum carrying the cutter heads by means of regulating pulses derived from the loading of the cutter drives. A suitable apparatus for carrying out the method comprises a pair of three-phase asynchronous motors used as cutter drives, a current transformer coupled to the power supply of each asynchronous motor, over-current and underload relays connected in parallel and excitable through each of said current transformers, reversing contactors responsive to said relays for driving a servo-motor in one direction or the other depending on the excited relay, a hydraulic pump biasable by said servo-motor, and a drive motor hydraulically actuable by said pump for driving the cutter drum.

---

My present invention relates to an improved method and means for regulating the rotary speed and feed-rate of the cutter heads in subterranean tunneling machines. The invention has particular relation to the type of machines operating according to the method described in the German Patent 1,002,775.

So far various control methods and arrangements are known for tunneling machines, which however operate independently of the load on the cutter assemblies, although such load is critical for the maximum permissible feed rate in any given case, depending on the strength of the rock, hardness and formation. In such machines the individual cutters are only provided with pure overload protective means such as fuses, bimetal relays or thermostats in the case of electric motor drives, or safety valves in the case of hydraulic motors. Only the rotary drum speed and the feed rate are adjusted, which two parameters have to be chosen by the machine operator in accordance with experience and thus remain too low from a certain feeling of safety. The machines thereby mostly operate far below their rated power and thus uneconomically. The drum and feed hydraulics on account of the necessary control requirements mostly comprise pumps having variable outputs, which maintain the set load with the aid of pressure controls known per se.

The German Patent No. 1,002,775 provides automatic control means which, however, only have to regulate the machine thrust, and furthermore comprise means for protection against overloading. The automatic control means are controlled by the cotorque that is exerted by the milling-knife-heads on to the knife-head carrier, i.e. the so-called rotary shield.

Said automatic control means, however, have not stood the practical tests, since a special and very complicated design and construction of the entire machine are required. Further, such automatic control means are very sluggish in action and susceptible to trouble.

In contradistinction to the disadvantages, drawbacks and inconveniencies of said prior-art means, the present invention is based on the task of providing a control arrangement and a control method for tunneling machines, which constantly ensure an optimum use of the machine and nevertheless afford the necessary safety against overloads.

What has just been said only is possible by eliminating the subjective feeling of the machine oepatror. Each machine knife-head together with the tools inserted on the periphery thereof, has a certain driving power (rated power) by an electric of hydraulic motor annexed thereto. Therefore and in accordance with the resistance offered by the various rocks and their formation against penetration of the cutter tools, the cutting volume per unit of time may be greater or smaller. Therefore, the number of revolutions of the drum and the feed rate also have to rise for attaining an optimum thrust with a lower cutting pressure, while said number of revolutions and feed rate have to be decreased when the cutting pressure of the rock is high. The rated power of the cutters shall be constantly attained but never exceeded.

The problem set by the invention is solved by controlling the speed of rotation of the drum carrying the cutter assemblies and the longitudinal feed acting in direction of the tunnel axis with the aid of regulating pulses which are derived from the load on the cutter drives.

As regulating pulse is used the current intenity in the case of electric motor drive, and the oil pressure in the case of hydraulic motors. The current intensity acts to operate an over-current or an under-current relay, depending on the load, and such relay actuates a reversing contactor for adjusting the output of the drum pump. In the case of a hydraulic drive, the reversing contactor is actuated via two pushbutton switches. By varying the drum-pump output, the drum r.p.m. may be varied, which affects the cutting depth of the tools and thereby the load on the cutter-driving motors.

The feed regulating pulse is taken off from the drum drive not directly by the cutters but via a tachometer. Thereby is attained a direct dependence between drum r.p.m. and feed rate and at the same time a deceleration with respect to the current fluctuations of the cutter motors. The impulse from the tachometer acts to reset a hydraulic servo-valve, whereby is metered the oil quantity for the machine feed cylinder. When the drum speed rises, the feed rate is also increased, and when the drum speed drops, the feed rate is also decreased.

The control arrangement disclosed by the present invention therefore has the great advantage that the load on the cutter asemblies is used as regulating pulse and that the latter serves for adjusting the drum speed and, derived therefrom, the feed rate. Thereby the machine always may be used with maximum cutter loading, since in the case of overloading the drum speed and feed rate will be automatically decreased, and increased in the other case. All the processes will be carrieed out independently of the machine operator per se.

Further details and inventive features will become apparent from the following description of embodiments of the present invention which are illustrated in the drawing.

FIG. 2 is a typical load diagram (current takeup) of a cutter-driving motor;

FIG. 3 shows a circuit diagram of the feed-cylinder control with a tachometer, servo-valve and hydraulic assembly;

FIG. 4 is a coordinate system depicting the interrelation of drum speed and feed rate;

FIG. 6 schematically shows a tunneling machine in longitudinal section; and

FIG. 7 depicts a tunnel cross-section for the purpose of illustrating the rotation of cutter-head and drum.

Figure 1:
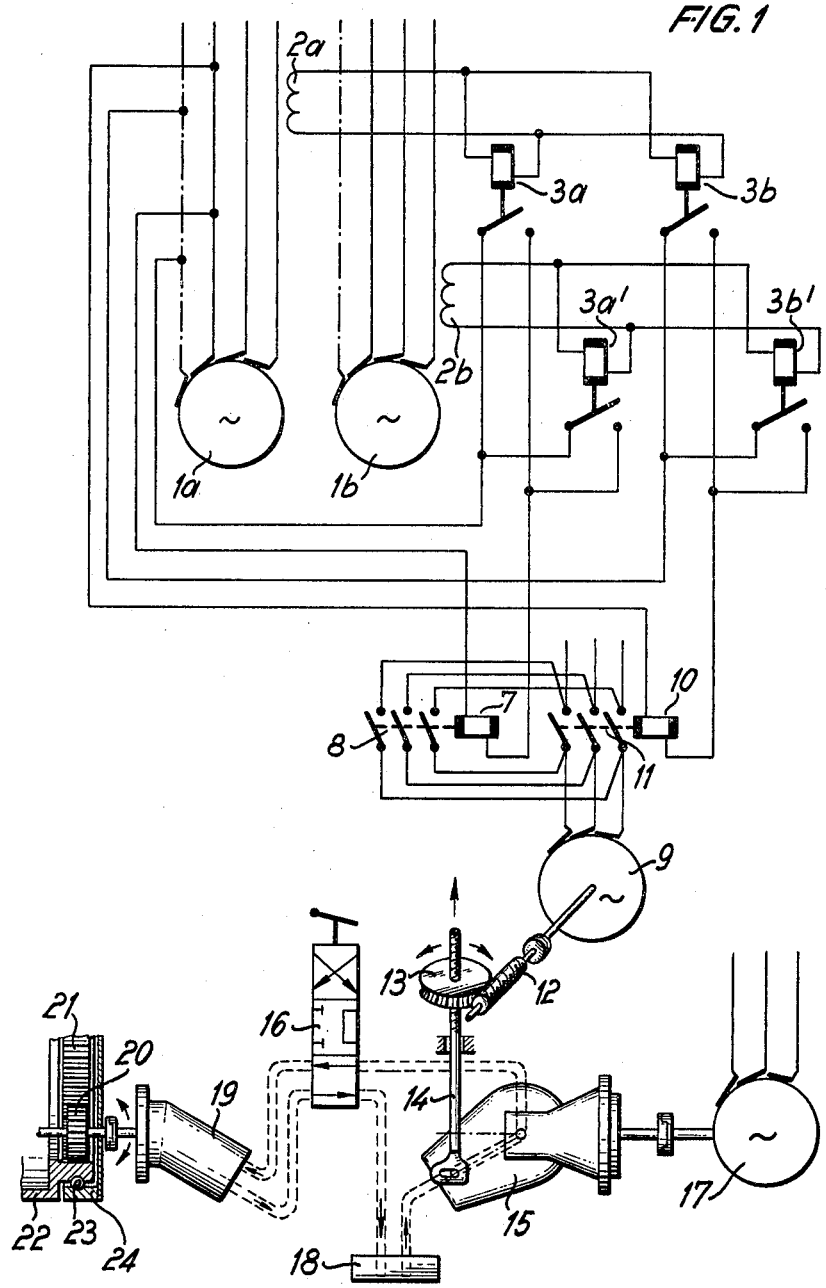
FIG. 1 shows a circuit diagram of the control means for the drum pump, with current relay and reversing contactor.

In FIG. 1 is shown the circuit diagram for the control arrangement of the drum pump. In the example shown, the two cutter-driving motors 1a and 1b are three-phase current asynchronous motors, and their supply comprises each three phases and a protective conductor. In both of the motors 1a, 1b the current transformers 2a, 2b are connected to one phase for the purpose of lowering the high current intensities in the control circuit. To the current transformers 2a, 2b are connected in parallel two current relays 3a, 3b and 3a', 3b' each, one of said relays acting as over-current relay 3a and the other acting as under-current relay 3b. The function of the relays is apparent from FIG. 2 which shows the run of the current take-up curve 4 of a cutter-driving motor 1a. The top line 5 shows the rated power of the motor, the bottom line 6, for example, 80% of the rated power. Between the lines 5, 6 the current takeup may fluctuate, without intervention of the control means.

If and when the rated current (FIG. 5) is exceeded by a cutter, one of the two over-current relays acts and closes the control circuit of the coil 7 on the reversing contactor 8, whereby the servo-motor 9 is switched on. When, however, the current take-up drops below the line 6, the underload relay 3b or 2b' is actuated and closes the control circuit of the coil 10 on the reversing contactor 11, whereby however the motor 9 rotates in the opposite direction.

Depending on the conventional direction of rotation of brush-shifting motor 9, a threaded spindle 14 will be moved up or down via a worm 12 and a worm wheel 13, so that the hydraulic pump 15 will be angularly turned. Hydraulic pump 15 is an axial piston pump in which the output is variable by swiveling the pump body. When the angle of swing is increased, the output also will be increased. Starting from the intermediate position, an angular upward and downward movement of the pump 15 were possible and thereby also a reversal of the direction of delivery, but in the arrangement or circuit shown such reversal is effected by a hydraulic slide 16. The pump 15 will be swiveled to one side only, and the movability of threaded spindle 14 is limited by terminal switches (not shown).

The axial piston pump 15 is driven by a three-phase motor 17 of constant speed. The oil is sucked up from the tank 18 by pump 15 and forced to the drum motor 19. The latter also is an axial piston motor but has an invariable angle of swing i.e. it delivers a constant volume at each revolution.

Depending on the adjustment of drum pump 15, the speed of drum motor 19 varies, and its direction of rotation is variable by means of the hydraulic slide 16. To the drum-motor shaft is coupled a pinion 20 of which the teeth are engaged in the tooth rim 21 of cutter drum 22, rotating the latter. Cutter drum 22 is mounted for rotation via a large ball-type rotary connection 23 or cross-rollers in the stationary drive shield 24 to which also is secured the drum motor 19.

While the pulse for regulating the drum speed is taken directly from the cutter motors 1a and 1b, the feed rate is regulated in dependency on the drum speed (see FIG. 3). Aside of the pinion 20, the shaft of the drum pump motor 19 drives a tachometer 25, and the voltage delivered therefrom also rises with increasing rpm. The conversion of this electric pulse to the variable drive-out speed of the hydraulic food cylinder 26 takes place via a known proportionally operating servo-valve 27 of two-stage design.

As shown in FIG. 3, the first valve stage comprises a first slip-stream tube 28 which is driven through a symmetrical moving-magnet system 29. Tube 28, through which flows constantly a very small volume of pressurized oil, serves as precontrol of the second stage. The latter comprises a fully balanced piston 30 which, with an overlap equal to zero, controls the inflow and outflow of the pressurized oil into the feed cylinder 26. In the intermediate position of tube 28, the kinetic energy of the outflowing oil in the two precontrol passages 31a and 31b is reconverted in the same manner to potential energy. Piston 30 on both endfaces is acted on by the same pressure and thus asumes an intermediate position, aided by a restoring spring 32. When coil 33 of the magnet system is excited by the current of tachometer 25, tube 28 will leave its intermediate position and thereby also move piston 30 from its intermediate position. The higher the drum speed, the higher the current intensity produced by tachometer 25 and the greater the deviation of tube 28 and the displacement of piston 30. The second coil 34 of moving-magnet system 29 is unconnected so that the deflection of tube 28 wlil take place to one side only.

The pressurized oil required for moving the food cylinder 26, is produced by a hydraulic pump 36 driven by a three-phase motor 35. Oil will be sucked from tank 37 and forced by a pump 36 to servo-valve 27. In the latter and depending on the position of tube 28, a certain quantity of oil is forced by piston 30 into cylinder 26 to initiate the feed movement, while the remainder of the oil returns into tank 37. An overflow valve 38 protects the hydraulic circuit against overload.

This layout affords a directly proportional relation between drum speed $n_{TR}$ and feed rate $n_{Vor}$ as will be apparent from line 39 in FIG. 4. In order, however to be able to also select other ratios between drum and feed, a potentiometer 40 is provided in the line from tachometer 25 to coil 33. Thereby the feed rate may be made to rise more rapidly (see line 41, FIG. 4) or more slowly (line 42) than the drum speed, depending on the potentiometer setting.

Potentiometer 40 which brings about a stepless change of the proportionality factor, may be replaced by a tapping switch with correspondingly rated or gaged partial resistors. It further is possible to provide the potentiometer axle or, respectively, the actuating knob with detent means. In this manner the proportionality factor may be changed step by step.

Figure 5:
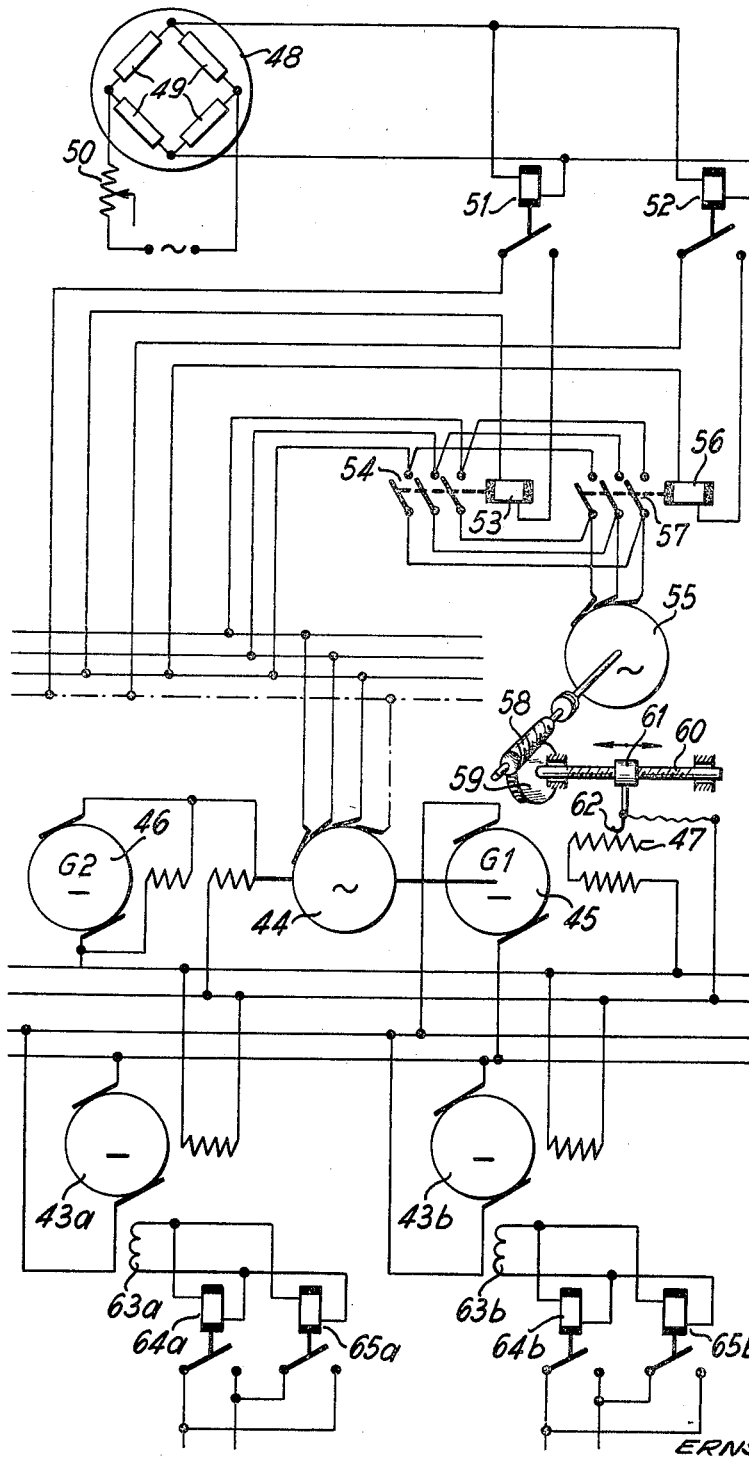
FIG. 5 shows a circuit diagram of the control unit in the case of an infinitely-variable rotary-speed adjustment of the cutter motors by pulse from the feed thrust.

The control device described above is based on the constant-speed cutter drive, for example with the aid of three-phase asynchronous motors. It may also be of advantage, however, to make the knife-head speed infinitely variable for better adaptation of the cutting speed to the rock to be removed. This may be effected, for example, by using D.C. shunt-wound motors 43a and 43b as cutter drives (FIG. 5). Since, however, D.C. mains are hardly available any longer today, the three-phase current has to be converted by means of rectifiers or as shown in FIG. 5, by a Leonard set. A three-phase motor 44 (squirrel cage motor) is mains-fed and drives a D.C. generator 45 which receives its exciting voltage from D.C. generator 46. The exciting voltage for generator 45 is adjustable through a resistor 47 and biases the direct current delivered by generator 45 through corresponding variations of its voltage. The cutter drive motors 43a and 43b are fed with the widely variable voltage derived from D.C. generator 45, whereby the speed of said motors becomes steadily adjustable. A last requirement is to obtain a load-depending regulating pulse for the rpm-adjustment. As a measure for the workability of the rock and for the cutting speed to be selected, the necessary feed thrust is measured. In the circuit diagram of FIG. 5 this is attained by the insertion of a pressure cell 48 between feed cylinder 26 and the stay means.

The mechanical compressive force is converted to a corresponding measuring signal by means of extensometer strips 49 disposed in pressure cell 43. Four of the strips 49 are connected to form a Wheatstone bridge. When a force acts upon cell 48, the bridge will become electrically unbalanced. The unbalance voltage arising therefrom corresponds in its magnitude to the force acting on cell 48, whereby the mechanical measured quantity has been converted to an electrical measured quantity. For the purpose of adaptation to varying rock conditions, the dependency of feed pressure and cutter speed has to be adjustable. This is attained by varying the voltage applied to the bridge with the aid of a potentiometer 50, whereby in any given case another condition of voltage equilibrium prevails.

Just as the current intensity in the drum regulation, here the voltage is used for controlling or operating an overvoltage relay 52. When a definite maximum feed pressure (corresponding to a certain voltage) is exceeded, the overvoltage relay 51 becomes active and completes the circuit of coil 53 on the reversing contactor 54 of servo-motor 55 whereby the latter is switched on. If, however, the feed pressure drops below a certain value, the undervoltage relay 52 becomes active and completes the control circuit of coil 56 on reversing contactor 57 whereby, however, the servo-motor 55 runs in the opposite direction of rotation.

A nut 61 with a sliding contact 62 is reciprocated via worm 58 and worm wheel 59 with threaded spindle 60 according to the direction of rotation of motor 55, whereby resistor 47 for generator 45 is regulated. To each position of slider 62 corresponds a certain speed of the cutter motors 43a and 43b. Regulation of the drum speed takes place by taking off the motor current via current transformers 63a and 63b and over-current relays 64a and 64b or respectively underload relays 65a and 65b for excitation of the coils 7 and 10 on the reversing contactor 8 and 10 of servo-motor 9 for angularly moving drum pump 15. The circuit diagram following the current transformers 63a and 63b fully coincides with FIG. 1.

For a better understanding of the function of the various machine parts, FIG. 6 shows a longitudinal section through a tunnel, the tunneling machine being shown schematically. The drive shield 24 which on top and at the bottom is guided in the tunnel by gliding shoes, represents the carrier, or supporting part. On the inside circumference, shield 24 accommodate the ball-type rotary connection 23 for mounting the cutter drum 22 and supports the drum driving motor 19 with pinion 20. Cutter drum 22 is driven through its internal rim gear 21 from pinion 20 of drum motor 19. In two opposite bays of drum 22 are mounted the cutter assemblies which comprise two cutter disks 66a and 66b, two reduction gearing units 67a and 67b and the two drive motors 1a and 1b. FIG. 7 shows in a tunnel cross-section the cutter disks 66a and 66b and the tools 68, and illustrate the climb-milling method through rotation of the drum 22 and the cutter disks 66a and 66b.

The feed cylinder 26 is inserted between a column 69 that is hydraulically braced in the tunnel and the drive shield 24 for producing the feed pressure. During the stroke of cylinder 26, the drive shield 24 with the drum 22 and the cutters is pressed forwardly in the direction of feed. The column 69 then is loosened and pulled forwardly by retraction of cylinder 26. If the cutters are equipped with variable-speed motors 43a and 43b, a pressure cell 48 is disposed between feed cylinder 26 and column 69, as described above.

All the switching relays of the units and assemblies described above may with advantage be replaced by contactless electronic switch components such as transistors and the like.

I claim:
1. In a method of controlling the rotation and feed of a cutter drum having cutter heads and associated drives mounted on the drum for rotation in a planetary path in tunnelling machines, the improvement comprising the step of controlling the rotary speed and the longitudinal feed of the drum carrying the cutter heads by means of regulating pulses derived from the loading of the cutter drives, and varying the feed rate of the drum with respect to the rate of rotation of the drum.

2. A method as set forth in claim 1 in which the torque arising on the cutter serves as manipulated variable of the regulation.

3. A method as set forth in claim 2 in which the cutter drives are electric motors and the current absorption of the cutter drive motors as a torque measure is used as a variable quantity for the regulation.

4. A method as set forth in claim 1 in which in the case of infinitely-variable cutter drive motors, the rotary speed thereof is controlled by the arising feed pressure.

5. An arrangement for controlling the rotation and feed of a cutter drum having cutter heads and associated motor drives mounted on the drum for rotation in a planetary path in tunnelling machines comprising a pair of three-phase asynchronous motors used as cutter drive motors, a current transform coupled to the power supply of each asynchronous motor, over-current and under-load relays connected in parallel and excitable through each of said current transformers, reversing contactors responsive to said relays for driving a servo-motor in one direction or the other depending on the excited relay, a hydraulic pump biasable by said servo-motor, and a drive motor hydraulically actuable by said pump for driving the cutter drum.

6. An arrangement as set forth in claim 5 in which the hydraulic pump is designed as unilaterally swivelable axial piston pump, a hydraulic slide is provided for reversing the pressurized fluid flow produced by said pump, and the hydraulic drive motor is designed as axial piston motor having a throughflow volume that is constant per revolution.

7. An arrangement as set forth in claim 6 in which is provided a tachometer on the shaft of the hydraulic motor, a 4-way servo-valve of the proportional type of two-stage design including a rotary magnet system, the rotary-magnet system of said servo-valve being connected via potentiometer or a resistance tapping switch to said tachometer, a pressure piston for feeding the cutter drum a hydraulic pump for acuating said piston via servo-valve, and an overflow safety valve disposed on the pump discharge side.

8. An arrangement for controlling the rotation and feed of a cutter drum having cutters mounted on the drum for rotation in a planetary path in a machine for boring a tunnel comprising a pair of D.C. shunt motors supplied by generators and serving to drive the cutters, an exciting circuit for said D.C. motors comprising a D.C. generator and a rheostat, a control circuit made up of a pressure cell disposed between a bracing column in the tunnel and the feed cylinder and having four wire strain gages interconnected in the form of a Wheatstone bridge, of a potentiometer for adjusting the bridge balance. and of parallel connected over-voltage and minimum voltage relays energized by said bridge when unbalanced, and a regulating circuit made up of reversing contactors responsive to the operation of said relays, of an adjusting servo-motor having a direction of rotation depending on the actuated contactor, and of mechanical adjusting means for adjusting said rheostat.

9. An arrangement as set forth in claim 8 in which electronic switch components in lieu of the switching relays are used for evaluating the control pulses.

References Cited

UNITED STATES PATENTS

| | | | |
|---|---|---|---|
| 2,318,622 | 5/1943 | Paget | 173—7 |
| 2,758,825 | 8/1956 | Wohlmeyer | 299—1 |
| 2,798,707 | 7/1957 | Kandle | 173—7 X |
| 3,223,180 | 12/1965 | Akin et al. | 173—7 |
| 3,247,912 | 4/1966 | Reynolds | 173—7 |
| 3,323,839 | 6/1967 | Addison et al. | 299—1 |
| 2,466,709 | 4/1949 | Karr | 175—96 X |
| 3,346,299 | 10/1967 | Meyer | 175—96 X |

ERNEST R. PURSER, Primary Examiner

U.S. Cl. X.R.

173—7, 9